(12) United States Patent
Maughan

(10) Patent No.: US 11,509,197 B2
(45) Date of Patent: Nov. 22, 2022

(54) ELECTRIC PROPELLOR DRIVE AND VEHICLE USING THE SAME

(71) Applicant: AVID TECHNOLOGY LIMITED, Cramlington (GB)

(72) Inventor: Ryan Maughan, Northumberland (GB)

(73) Assignee: Avid Technology Limited, Cramlington (GB)

(*) Notice: Subject to any disclaimer, the term of this patent is extended or adjusted under 35 U.S.C. 154(b) by 489 days.

(21) Appl. No.: 16/622,790

(22) PCT Filed: Jun. 15, 2018

(86) PCT No.: PCT/GB2018/051662
§ 371 (c)(1),
(2) Date: Dec. 13, 2019

(87) PCT Pub. No.: WO2018/229506
PCT Pub. Date: Dec. 20, 2018

(65) Prior Publication Data
US 2021/0152053 A1    May 20, 2021

(30) Foreign Application Priority Data

Jun. 15, 2017  (GB) ..................... 1709539

(51) Int. Cl.
| | | |
|---|---|---|
| *H02K 11/33* | (2016.01) |
| *H02K 9/22* | (2006.01) |
| *B64C 39/02* | (2006.01) |
| *B64D 27/24* | (2006.01) |
| *B64D 31/00* | (2006.01) |
| *H02K 5/173* | (2006.01) |
| *H02K 7/08* | (2006.01) |
| *H02K 21/24* | (2006.01) |

(52) U.S. Cl.
CPC ........... *H02K 9/223* (2021.01); *B64C 39/024* (2013.01); *B64D 27/24* (2013.01); *B64D 31/00* (2013.01); *H02K 5/1732* (2013.01); *H02K 7/083* (2013.01); *H02K 11/33* (2016.01); *H02K 21/24* (2013.01); *B64C 2201/027* (2013.01); *B64C 2201/042* (2013.01); *B64C 2201/108* (2013.01); *H02K 2205/03* (2013.01)

(58) Field of Classification Search
CPC ........ B64C 2201/027; B64C 2201/108; B64C 2201/042; B64C 39/024; B64D 31/00; B64D 27/24; H02K 2205/03; H02K 21/24; H02K 7/083; H02K 11/33; H02K 9/223
USPC ........................................................... 310/64
See application file for complete search history.

(56) References Cited

U.S. PATENT DOCUMENTS

| 5,619,087 | A | * | 4/1997 | Sakai | ................... | H02K 1/12 |
| | | | | | | 310/410 |
| 2013/0119185 | A1 | * | 5/2013 | Botti | ................... | B64C 27/14 |
| | | | | | | 244/17.11 |

FOREIGN PATENT DOCUMENTS

JP    2014222110    * 11/2014   ............. H02K 19/16

* cited by examiner

*Primary Examiner* — Terrance L Kenerly
(74) *Attorney, Agent, or Firm* — Temmerman Law; Mathew J. Temmerman

(57) ABSTRACT

An electrically powered propellor apparatus comprising an axial flux electric machine. The axial flux electric machine comprises a rotor, at least one stator and a shaft. The shaft mounts the rotor and the shaft is mounted in at least two spaced apart thrust bearings. Each of the thrust bearings is (Continued)

configured to resist thrust in opposing axial directions of the shaft. The shaft has a propellor mounted on at least one end thereof.

19 Claims, 5 Drawing Sheets

ELECTRIC PROPELLOR DRIVE AND VEHICLE USING THE SAME

FIELD OF THE INVENTION

The present invention relates to a propellor drive and in particular to a propellor drive including an electric motor.

BACKGROUND OF THE INVENTION

Some vehicles that use propellors, such as unmanned aerial vehicles (UAV's) use an electric motor to drive the propellers thereof. The arrangement known in the art uses a radial flux motor to generate rotational motion which is transferred to the propellor either directly or via a gearbox. In a radial flux motor the magnetic flux travels in a direction that is radial to the axis of the propellor shaft. The torque generated is proportional to the radius of the rotor and the magnetic field strength between the rotor and stator magnets. As the speed of a radial flux motor increases so does its efficiency. Typically, a radial flux motor operates at approximately 100,000 revolutions per minute.

The radial motors for UAVs typically have a rotor situated to the outside of the stator. This allows the motor to run more slowly and generate greater torque, which is desirable in a UAV application. However, it is difficult to keep these radial motors cool. To overcome this difficulty the casing of the motor is open, which allows hot air to escape, but also permits ingress of rain water and aerial borne particulate matter, which can damage the motor. In the radial motors used in UAV applications the rotor and stator magnets can easily touch due to misalignment (run out) between the drum carrying stator and the magnets. If the motor and stator touch, failure of the motor is usually catastrophic. In the case of a UAV, failure of one of the motors, may result in catastrophic failure of the UAV.

It would therefore be desirable to provide an improved electric drive for UAV's.

Axial flux electric machines which comprise a wide flat rotor with magnets embedded therein situated between stator windings above and below the rotor are known. The magnetic flux flows in a direction axial to a shaft about which the rotor turns.

However, axial flux electric machines are expensive to build and can themselves suffer from over heating problems.

GB2485184 describes an axial flux electric machine which addresses the issue of cooling. In this patent the stator is attached to and is in thermal contact with the housing of the electric machine, and through this contact heat generated by the electric machine may be dissipated.

It would be desirable to provide an improved drive for an aerial vehicle, in particular an unmanned aerial vehicle (UAV). It would also be desirable to provide an improved aerial vehicle.

SUMMARY OF THE INVENTION

According to a first aspect of the invention there is provided an electrically powered propellor apparatus comprising an axial flux electric machine, the electric machine comprising a shaft, which shaft mounts the rotor, wherein the shaft is mounted in at least two spaced apart thrust bearings, each of the thrust bearings configured to resist thrust in opposing directions along the axis of the shaft, and wherein the shaft has a propellor mounted on at least one end thereof.

The electric machine may comprise a housing and preferably at least one of the thrust bearings is attached to the housing.

It is preferred that each of the at least two thrust bearings is attached to the housing.

Advantageously, the or each thrust bearing that is attached to the housing is mounted in the housing.

Preferably, the or each thrust bearing is mounted in a thrust bearing support.

It is preferred that the or each thrust bearing support is attached to the housing.

The housing may be formed in at least two parts.

The electric machine may comprise two spaced apart stators, the rotor situated between the spaced apart stators.

Advantageously, the propellor is releasably mounted on the shaft.

Preferably, the apparatus includes a power electronics drive configured to control the delivery of electrical power to the or each stator.

The apparatus may further comprise at least one parameter sensor, the or each parameter sensor sensing a parameter of the electric machine.

According to a second aspect of the invention there is provided the combination of at least one electrically powered propellor apparatus according to the first aspect of the invention, an electrical power source, and a controller configured to control the flow of electrical current from the electrical power source to the at least electrically powered propellor apparatus.

The combination may comprise a body, the at least one electrically powered propellor apparatus attached to a body.

Preferably, the combination comprises an electrically powered propellor apparatus comprising a housing and at least one of the thrust bearings is attached to the housing, and wherein at least a part of the housing and at least a part of the body are comprised in a single component.

The single component may include a support arm and a part of the housing.

The combination may further comprise a plurality of rotational power delivery apparatus, and the body may include a central part and a plurality of distal supports extending from the central part, each distal support supporting a respective one electrically powered propellor apparatus at a location distal from the central part of the body.

The power electronic drive associated with a respective electric machine is preferably mounted on the central part of the body or on the distal support of the body supporting the respective electric machine.

The controller configured to control the flow of electrical current from the electrical power source to the at least one electrically powered propellor apparatus may be mounted on the central part of the body.

The combination may further comprise a communication network for carrying communication signals associated with the or each electric machine.

The communication network may comprise a single or twin wire network.

The combination communication network may be a CAN-Bus network.

The combination may be an aerial vehicle.

The aerial vehicle may be an unmanned aerial vehicle.

BRIEF DESCRIPTION OF THE DRAWINGS

In the Drawings, which illustrate preferred embodiments of the propellor drive and vehicle of the invention.

DETAILED DESCRIPTION OF THE PREFERRED EMBODIMENTS

Figure 1:
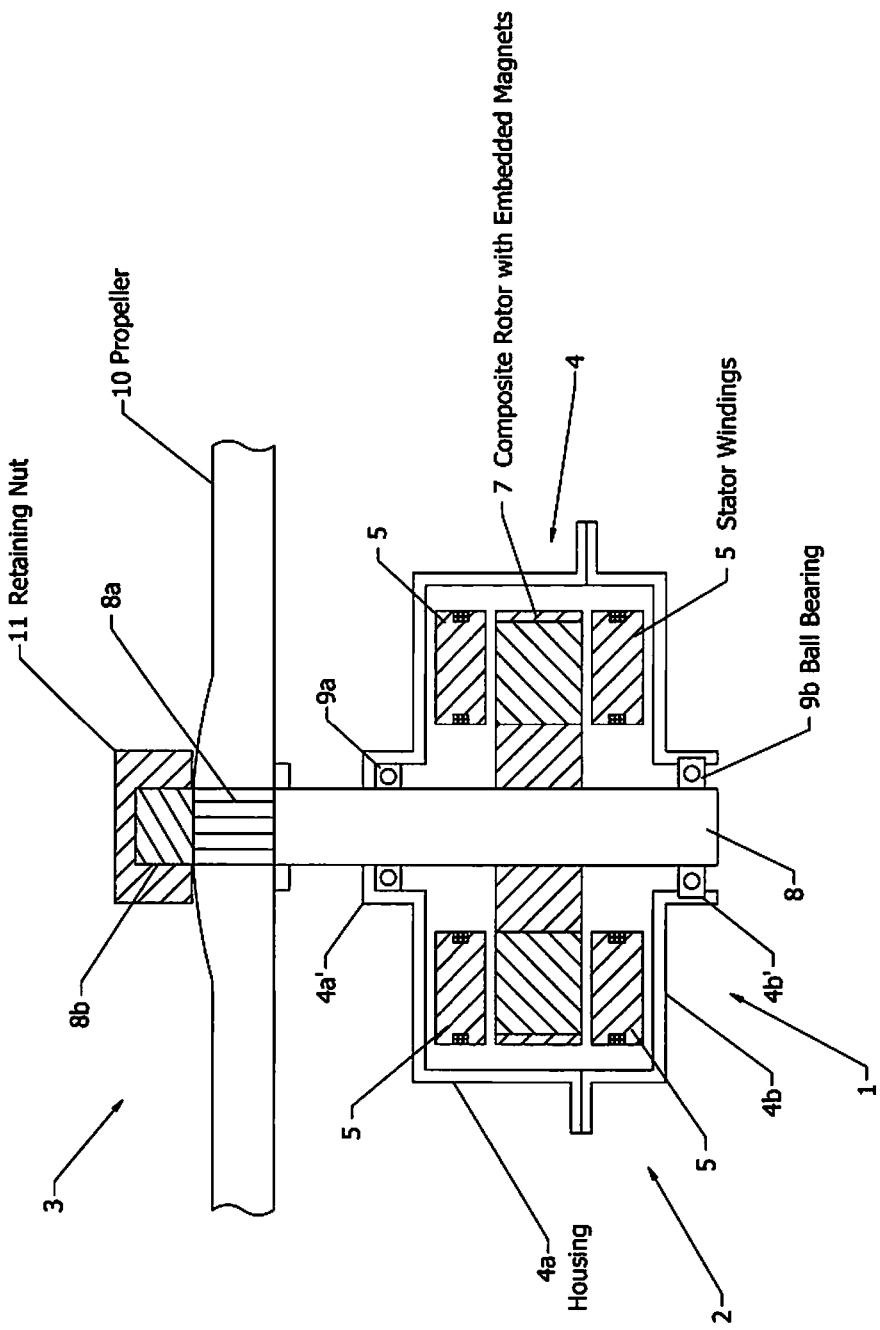
FIG. 1 is a schematic cross-section of a propellor drive assembly.

Referring now to FIG. 1, the propellor assembly 1 comprises an electric machine 2 and a propellor 3. The electric machine 2 comprises a housing 4 having spaced apart stator windings attached thereto. A rotor 7 is located in the housing between the spaced apart stator windings 5.

The rotor 7 is mounted on a shaft 8, which is mounted in the housing 4 by means of thrust bearings 9 themselves mounted in the housing 4.

The propellor 3 comprises a propellor blade 10 attached to a splined portion 8a of the shaft 8 and secured thereto by a retaining nut 11 which is fastened on to a correspondingly threaded portion 8b of the shaft 8.

The housing 4 comprises an upper part 4a and a lower part 4b. The upper part 4a includes a bearing housing 4a' in which the thrust bearing 9a is seated. The thrust bearing 9b is seated in a rebate 4b' in the housing 4b.

The stator windings 5 are in thermal contact with the upper and lower housing parts respectively. This provides the advantage that heat generated by the axial flux electric machine is dissipated to and through the upper and lower housing parts 4a, 4b. By arranging the propellor 3 directly on the shaft 8 of the electric machine 2 operation thereof causes fluid, typically air, to be forced over the housing 4 of the electric machine. Heat transferred from the stator windings to the housing is then dissipated by the forced flow of fluid from the propeller. The housing may be provided with fins or other adaptations to increase the surface area of the housing, which provides for better heat transfer from the housing to the forced flow of fluid from the propellor.

Figure 2:
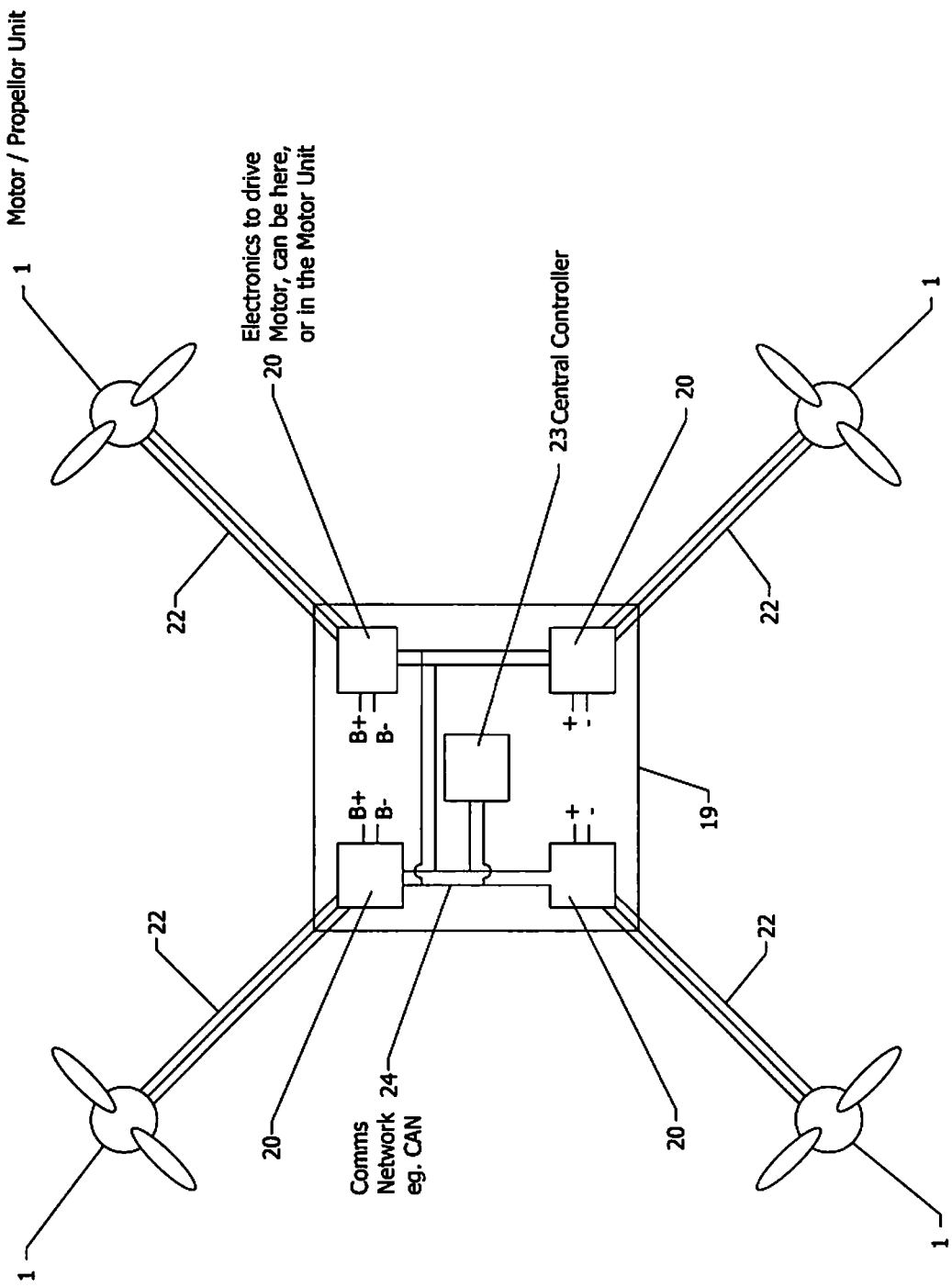
FIG. 2 is a schematic plan view of an unmanned aerial vehicle using the propellor drive illustrated in FIG. 1.

FIG. 2 illustrates an unmanned aerial vehicle comprising four propellor assemblies 1 and a UAV body 19. Four arms 22 located at 90 degrees to one another extend from the UAV body 19. The four propellor assemblies 1 are mounted on the remote ends of respective arms 22. Mounted on the body 19 are four power electronic drives 20, each associated with a respective one of the propellor assemblies 1.

A battery is also mounted on the body 19, providing electrical power for the power electronic drives 20.

A central controller 23 is also mounted on the body 19. The controller 23 communicates with the power electronic drives 20 over a communication network 24, such as the CAN bus protocol. In the illustrated embodiment, the communication network 24 comprises cabling connecting the central controller 23 to the power electronic drives 20.

Figure 3:
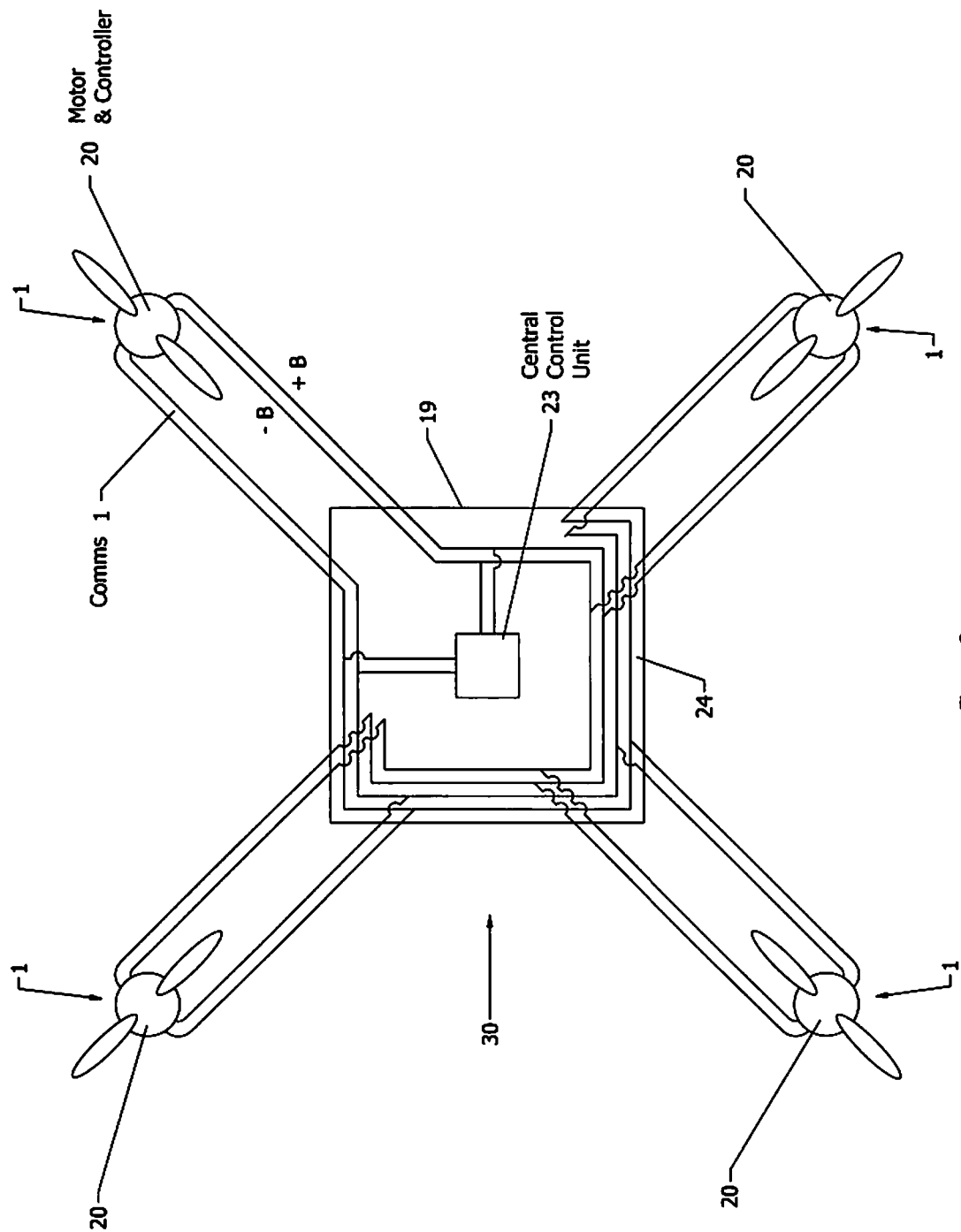
FIG. 3 illustrates an alternative embodiment of an unmanned aerial vehicle using the propellor drive illustrated in FIG. 1.

FIG. 3 illustrates an alternative embodiment of an unmanned aerial vehicle 30 comprising propellor assemblies 1. The UAV 30 differs from the embodiment shown in FIG. 2 in that the power electronic drives 20 driving the electric machine 2 are situated at the propellor assembly, typically mounted on the housing 4. A central controller 23 is mounted on the body 19, this central controller communicating with the power electronic drive situated at each electric machine 2. Communication between the power electronic drives 20 and the central controller 23 is over a communication network 24 as described with reference to FIG. 2.

The advantage of mounting a power electronic drive 20 adjacent each electric machine 2 is that the distance from controller to motor is reduced and hence shorter cables between the power electronics and the electric machine may be used. When a high frequency signal is transmitted through a cable noise is produced. This noise is also known as the electromagnetic signature. The longer the cable the greater the noise.

In the illustrated embodiment, a battery is comprised in the control unit 23. As can be seen from FIG. 3 two cables, one positive B+ and one negative B− extend from the control unit 23 delivering power to each of power electronic drives 20.

The controller 23 is configured to monitor parameters of the electric machine 2, such as shaft speed. Other parameters, for example temperature, may also be monitored. The controller is programmed to incorporate the monitored parameters into control signals sent to each electric machine via the communication network 24. In both the FIG. 2 and FIG. 3 example, the communication network 24 uses cables. These may be single wire or twin wire cables.

Figure 4:
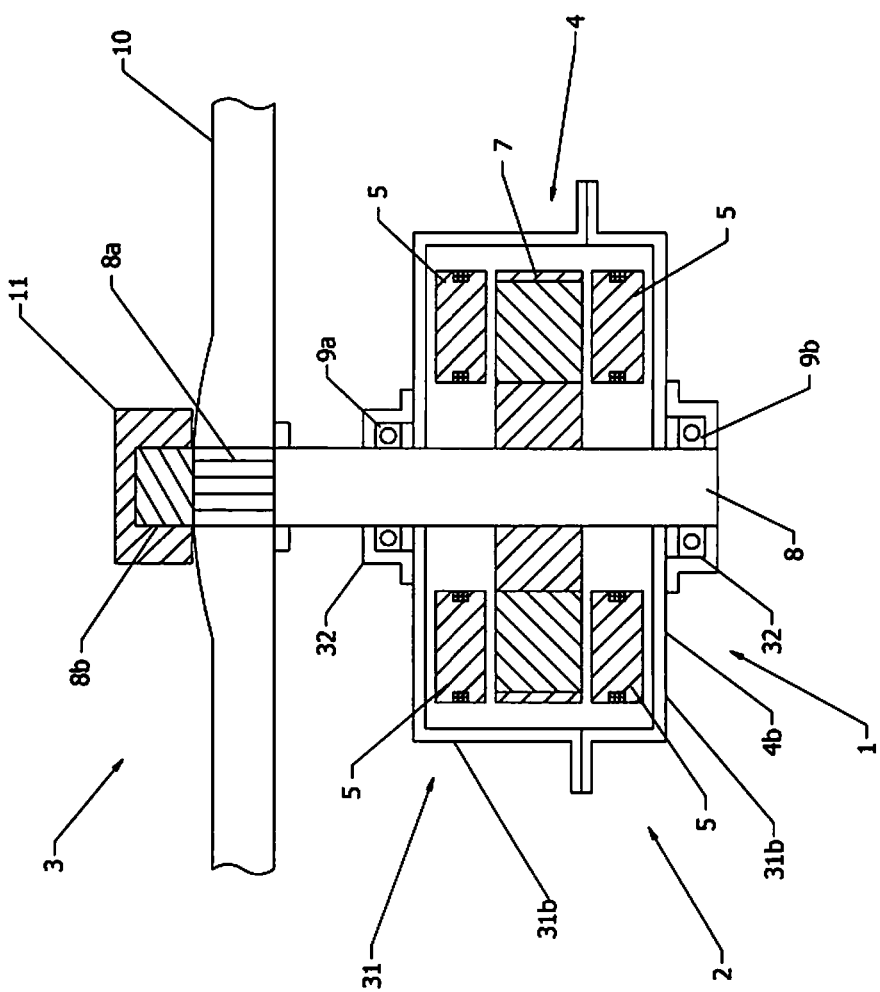
FIG. 4 is a schematic cross-section of an alternative arrangement of a propellor drive assembly.

Referring now to FIG. 4, the propellor drive assembly differs from that shown in FIG. 1 in that the thrust bearings 9a, 9b are housed in thrust bearing supports 32 that are attached to the housing parts 31a, 31b of the housing 31 rather than forming a part of the housing.

Figure 5:
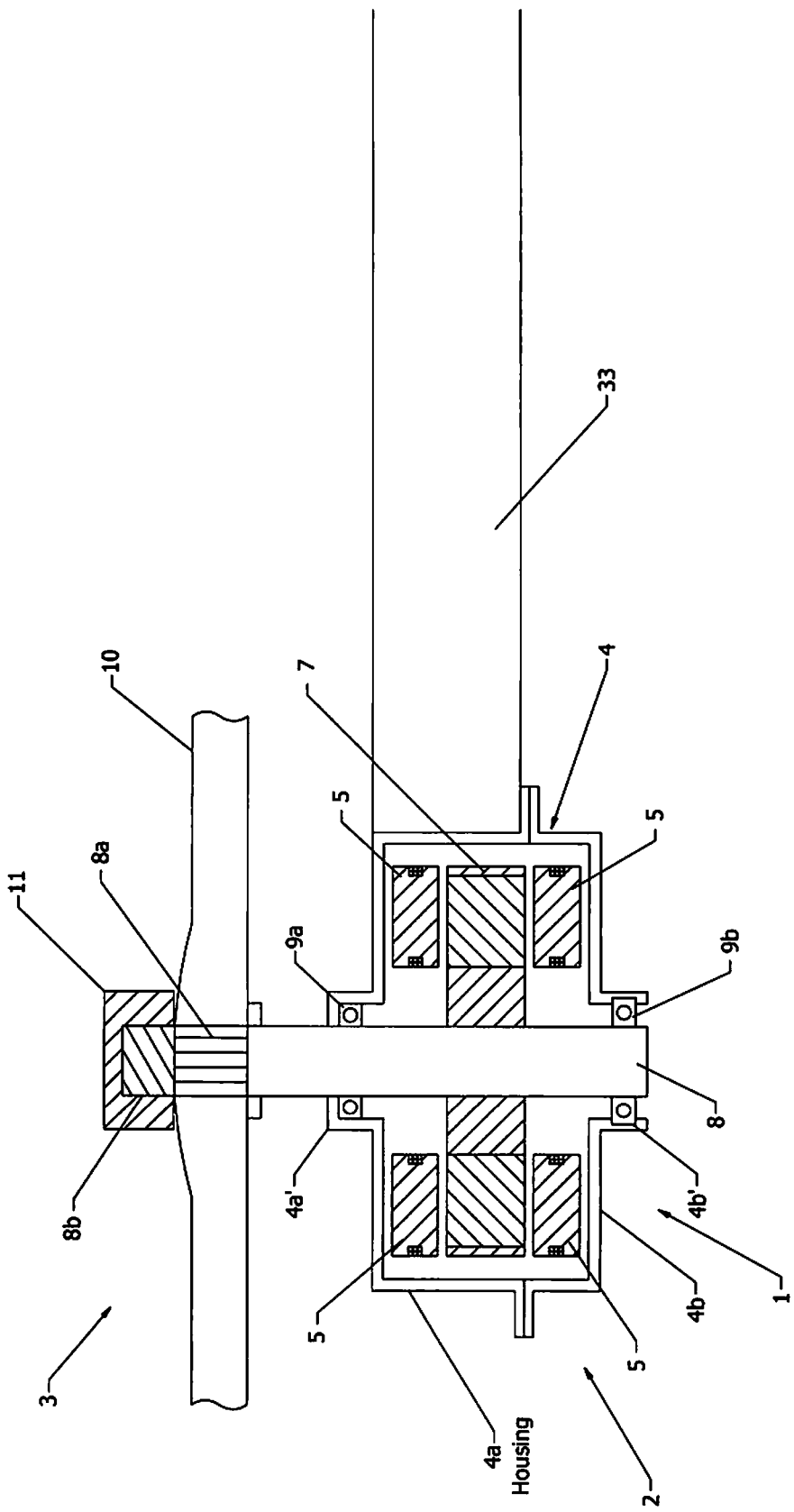
FIG. 5 is a schematic cross-section illustrating a support arm and propellor assembly.

FIG. 5 illustrates a further embodiment where the housing part 4a of the propellor assembly and the support arm 33 associated therewith are formed as a single component.

The invention claimed is:

1. An electrically powered propellor apparatus comprising an axial flux electric machine, the electric machine comprising a rotor, at least two spaced apart stator windings and a shaft, which shaft mounts the rotor, wherein the shaft is mounted in at least two spaced apart thrust bearings, each of the thrust bearings configured to resist thrust in opposing axial directions of the shaft, and wherein the shaft has a propellor mounted on at least one end thereof, wherein the electric machine comprises a housing and at least one of the thrust bearings is attached to the housing, and wherein the housing is formed in at least two parts, and wherein the rotor is situated between the space apart stator windings, wherein each stator windings is in thermal contact with a respective one of the at least two housing parts, and wherein the propellor is releasably mounted on the shaft.

2. An apparatus according to claim 1, wherein each of the at least two thrust bearings is attached to the housing.

3. An apparatus according to claim 2, wherein the or each thrust bearing that is attached to the housing is mounted in the housing.

4. An apparatus according to claim 1, wherein each thrust bearing is mounted in a thrust bearing support.

5. An apparatus according to claim 4, wherein each thrust bearing support is attached to the housing.

6. An apparatus according to claim 1, including a power electronics drive configured to control the delivery of electrical power to the stator windings.

7. An apparatus according to claim 1, wherein the apparatus further comprises at least one parameter sensor, the at least one parameter sensor sensing a parameter of the electric machine.

8. The combination of at least one electrically powered propellor apparatus according to claim 1, and a controller configured to control the flow of electrical current from the electrical power source to the at least one electrically powered propellor apparatus.

9. The combination of claim 8, comprising a body, the at least one electrically powered propellor apparatus attached to a body.

10. The combination according to claim 9, wherein at least a part of the housing and at least a part of the body are comprised in a single component.

11. The combination according to claim 10, wherein the single component includes a support arm and a part of the housing.

12. The combination of claim 9, comprising a plurality of apparatus, and wherein the body includes a central part and a plurality of distal supports extending from the central part, each distal support supporting a respective one electrically powered propellor apparatus at a location distal from the central part of the body.

13. The combination of claim 12 including a power electronics drive configured to control the delivery of electrical power to each stator winding, wherein the power electronic drive associated with a respective electric machine is mounted on one of: the central part of the body and the distal support of the body supporting the respective electric machine.

14. The combination of claim 9, wherein the controller configured to control the flow of electrical current to the at least one electrically powered propellor apparatus is mounted on the central part of the body.

15. The combination of claim 9, further comprising a communication network for carrying communication signals associated with each electric machine.

16. The combination of claim 15, wherein the communication network comprises a network that is one of: a single and twin wire network.

17. The combination of claim 15, wherein the communication network is a CAN-Bus network.

18. The combination of claim 9, wherein said combination is an aerial vehicle.

19. The combination of claim 18, wherein the aerial vehicle is an unmanned aerial vehicle.

* * * * *